May 27, 1958 R. F. WITTENMYER 2,835,976
PARALLEL RULE PROTRACTOR
Filed Aug. 16, 1956 2 Sheets-Sheet 1
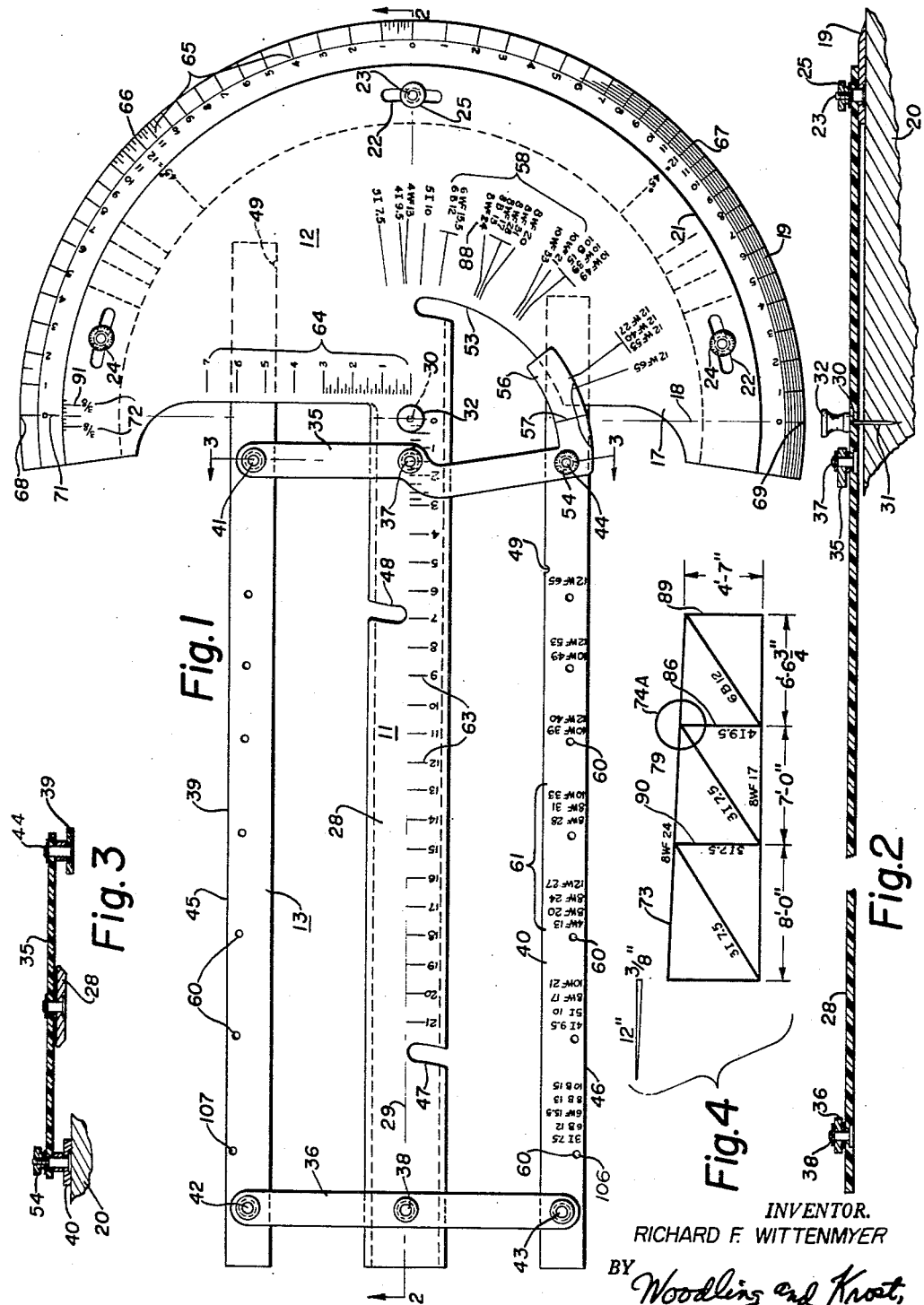
INVENTOR.
RICHARD F. WITTENMYER
BY Woodling and Krost,
attys May 27, 1958 R. F. WITTENMYER 2,835,976
PARALLEL RULE PROTRACTOR
Filed Aug. 16, 1956 2 Sheets-Sheet 2
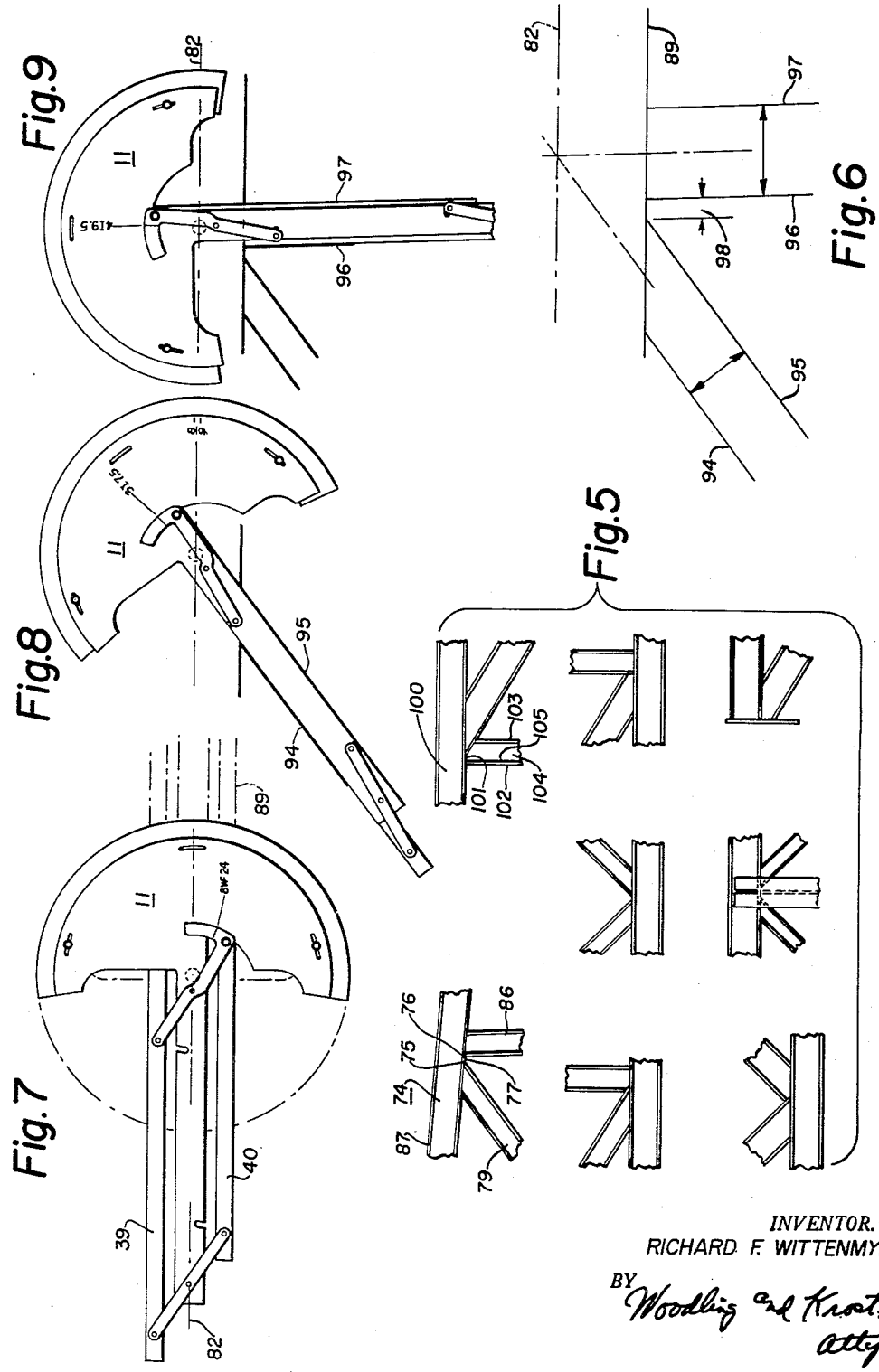
INVENTOR.
RICHARD F. WITTENMYER
BY Woodling and Krost,
attys.

United States Patent Office 2,835,976
Patented May 27, 1958

2,835,976

PARALLEL RULE PROTRACTOR

Richard F. Wittenmyer, Cleveland, Ohio, assignor to The Austin Company, a corporation of Ohio Application August 16, 1956, Serial No. 604,386

10 Claims. (Cl. 33—76)

The invention relates in general to a drafting instrument and more particularly to a combined protractor and variably spaced parallel rules or blades.

The drafting instrument of the present invention is specifically designed to lay out lines at pre-selected angles, and especially parallel lines at such angles with the parallel lines being equally spaced relative to a center line disposed at the selected angle. This drafting instrument has special use in a problem of laying out steel beam trusses. Whenever a new beam type truss is designed, it is designed in a single line diagram showing the individual chord, posts, and diagonal members each being formed from a beam, commonly a steel beam. These beams may have the usual I or H cross section with webs and flanges. This single line diagram of the completed truss may then be drawn as the completed truss using beam members scaled to the correct width. The finished truss drawing is necessarily of much smaller scale than the actual truss, especially with long trusses commonly in use today. The joints at the intersection of the chord, diagonal, and post members are commonly welded and welded completely around the periphery of the joints for strength and to eliminate corrosion at the joints. The welder must be able to satisfactorily use his welding implement, whether a torch or an electrode, at this joint. Because the truss diagram necessarily is very small scale, one cannot determine satisfactorily from this truss drawing whether the welder will have sufficient space to use his welding implement at each part of each joint. Therefore, it is essential for good welding practice that an enlarged scale drawing of the questionable joints be made to see if the required space such as one-fourth or one-half inch is available along each of the proposed weld lines.

The drafting instrument of the present invention makes such large scale layouts of each joint a very simple matter since one may quickly determine the proper pitch of the proposed beam member, the depth of such member, the thickness of the flanges on this beam member, and the length of the beam member; and also where a roof truss is used which has a slight drainage pitch on the upper chord member, the drafting instrument provides a ready means to slightly shift the pitch of all beam members to a new pitch corresponding to the angle of these beam members relative to the upper chord member.

Accordingly, an object of the present invention is to provide a drafting instrument with which one may quickly and easily determine the angle and depth of a beam in a beam type truss.

Another object of the invention is to provide a drafting instrument incorporating a protractor head and parallel blade means which may be varied in lateral spacing relative to a center line of the drafting instrument.

Still another object of the invention is to provide a combined protractor and parallel blade means with a plurality of calibration marks for indicating pitch, lateral spacing relative to a center line, additional lateral spacing for two additional lines, linear scales in two perpendicular directions, and calibration marks for additional slight shifting of angular pitch of the parallel blades.

Still another object of the invention is to provide an instrument to aid in the correct laying out of reinforced members of pre-determined width and angle.

Another object of the invention is to provide a parallelogram linkage in connection with a drafting instrument wherein two parallel blades may be maintained parallel and equidistant from a center line, yet are relatively variable in spacing from such center line.

Other objects and a fuller understanding of this invention may be had by referring to the following description and claims, taken in conjunction with the accompanying drawing, in which:

Figure 1 is a plan view of the drafting instrument of the invention;

Figure 2 is a sectional view on the line 2—2 of Figure 1;

Figure 3 is a sectional view on the line 3—3 of Figure 1;

Figure 4 is a line diagram of one-half of a roof truss, the joints of which the drafting instrument of this invention may be used for laying out to larger scale;

Figure 5 shows a group of different type of joints which may be used;

Figure 6 is an enlarged view of a joint of a truss layed out as by the use of the drafting instrument of the present invention; and Figures 7, 8, and 9 show three different steps in the use of the drafting instrument.

The drawings show the drafting instrument 11 as including a protractor head 12 and a parallel rule section 13. The entire drafting instrument may be made from relatively thin transparent material, such as transparent plastic, such as is conventionally used in drafting instruments through which it is desired to see.

The protractor head 12 includes generally a semi-circular head portion 17 having a base line 18 and having an arcuate semi-circular ring member 19. The ring member 19 is adapted to lie in a first plane and to rest on a support such as a drafting table shown at 20 in Figure 2. The ring member 19 is adapted to be partially outboard and partially inboard of the outer semi-circular periphery 21 of the head portion 17. Arcuate slots 22 are formed in the head portion 17 and bolts 23 are fastened in the ring member 19 in any suitable manner. These bolts 23 extend through the arcuate slots 22 and nuts engage the bolts 23. In the embodiment shown two knurled nuts 24 are provided and a plain nut 25 is provided at the center bolt.

An integral arm 28 extends outwardly perpendicular to the base line 18 from the semi-circular head portion 17. This integral arm has a center line 29, and a pivot hole 30 is provided at the intersection of the base line 18 and center line 29. A pivot pin 31 having a finger grip head 32 is receivable within this pivot hole 30 to be pressed into the drafting board 20 so that the entire drafting instrument 11 is pivotable about this pivot pin.

First and second parallelogram links or parallel arms 35 and 36 are provided and are pivoted to the integral arm 28 at pivots 37 and 38, respectively. First and second parallel blades 39 and 40 are a part of the parallel rule section 13 and are pivoted to the first and second parallelogram links 35 and 36. Such pivoting is at the four pivots 41 through 44 and these pivot points are equidistant from the center line 29 of the arm 28 and are equidistantly spaced on the parallel blades 39 and 40 so that the links 35 and 36 may swing in approximately a ninety degree arc, from the position shown in Figure 1, to collapse the blades 39 and 40 toward each other. This swinging movement of the links 35 and 36 thus permits the blades 39 and 40 to be pivoted in a parallelogram manner to swing the parallel blades closer together and farther apart yet remaining parallel and with each of the outer edges 45 and 46 remaining equidistant relative to the center line 29.

Recesses 47 and 48 are provided in the arm 28 in order to receive the pivot points 41 and 43 so that the blades 39 and 40 may collapse underneath the integral arm 28. As best shown in Figure 3, the parallel blades 39 and 40 are in the first plane of the ring member 19, the arm 28 is in the second plane of the head portion 17, and the parallelogram links 35 and 36 are in a third plane spaced on the opposite side of the arm 28 from the plane of the blades 39 and 40. Small semi-circular recesses 49 may also be formed in the inner edges of the blades 39 and 40 to encompass the pin 31 so that the blades 39 and 40 may be collapsed completely.

During the collapsing movement of the blades 39 and 40, the pivot 44 moves within a large recess 53 formed in the head portion 17. The pivots 41, 42, and 43 may be non-adjustable as shown; but preferably at least one of the pivots has an adjustable friction clamp, and in this case the pivot 44 is shown as including a thumb nut 54 to act as an adjustable clamp on the entire parallelogram linkage of the links 35 and 36 and blades 39 and 40. Thus, when the thumb nut 54 is loosened, the blades may be varied in lateral spacing; and then, upon tightening this thumb nut 54, the blades 39 and 40 will retain their selected position.

An extension 56 is provided on the first link 35 and overlies a part of the head portion 17 adjacent the recess 53. This extension 56 carries an index mark 57 which cooperates with first calibration marks 58 on the head portion 17. This provides first calibration means for indicating the lateral spacing of the outer edges 45 and 46 of the parallel blades 39 and 40. A series of holes 60 are formed symmetrically in the two parallel blades 39 and 40 and second calibration marks 61 are placed adjacent each of these holes in the series, which calibration marks coincide with the first calibration marks 58 and which indicate a pre-selected distance of each hole relative to the adjacent outer edge 45 or 46. These second calibration marks 61 are preferably also placed on the parallel blade 39.

Third calibration marks 63 extend as a linear scale along the center line 29 from the pivot hole 30. Fourth calibration marks 64 extend at right angles to this center line 29 along the base of the semi-circular head portion 17.

Fifth calibration marks 65 extend around the semi-circular periphery of the ring member 19 and are angular calibration marks. As shown in the preferred embodiment, these marks are not calibrated in degree but rather in pitch with the numeral 12 as a denominator between points 66 and 67, which are at an angle of forty-five degrees relative to the center line 29. Between the point 66 and a point 68 and between the point 67 and another point 69, the calibration is in pitch relative to the numeral 12 as a numerator. This is in the arc of forty-five degrees to ninety degrees on each side of the center line 29.

An index mark 71 is provided on the ring member 19 and this index mark cooperates with sixth calibration marks 72 on the head portion 17. This cooperation may be effected by loosening the thumb nuts 24 and arcuately moving the ring member 19 relative to the head portion 17.

*Operation*

The parallel rule protractor of the present invention has particular use in the laying out of joints in steel beam trusses and, as such, the various calibration marks have been designed to meet this end. This is only one example of use of the drafting instrument, however, and the specific calibration marks are to be taken as illustrative rather than limiting in scope.

The third and fourth calibration marks 63 and 64 have been calibrated as a linear scale and in the actual device made in accordance with this invention, they have been calibrated half size in inches. This instrument, therefore, is especially adaptable to being used with drawings made to half scale.

The fifth calibration marks 65, being laid out in pitch relative to the numeral 12, either as a numerator or as a denominator, is a common way of denoting the pitch of a beam member in a beam truss. The pitch is expressed in inches of rise to inches of length and this expression of "pitch" is generally more convenient than an angular designation to a workman in actually cutting a beam to fit in a particular truss.

Where this drafting instrument 11 is used with steel beam trusses of standard I or H cross-section, these steel beams have standard weights per foot and standard dimensions in both overall depth and thickness of flange. The Figure 4 shows to a relatively small scale a line diagram of one-half of a steel beam truss 73, such as may have recently been designed for a particular job. The single line diagram represents each beam member and is used in the designing of the truss, wherein the tension or compression in each member may be calculated. Appropriate sizes of beams to resist such forces would have been selected and the steel beam truss of Figure 4, drawn to this relatively small scale, shows the selected sizes and weights per foot of the various beam members. In the fabricating of such a steel beam truss, every joint of the chord, post and diagonal beam members will ordinarily be welded completely around the periphery, with this welding being done not only for strength at the joint but to prevent corrosion within the joint. This means that with even a simple joint of an I-beam intersecting the flange of another beam, the welder must make a weld which is generally I-shaped continuously around the two flanges and the web of the first beam. When it is a more complicated joint, such as any of the many different types of joints shown in Figure 5, there are still more places to weld. The welder must be able to have ample access to every part of the joint to be welded so that his welding torch or welding electrode can reach these many places.

In Figure 5, there is shown such a welded joint 74 which is also shown as joint 74A in the line diagram of Figure 4. At this joint 74, Figure 5, there will be a weld at the line 75 and another weld at the line 76, separated by a short distance designated at 77. Experience has shown that a welder needs between one-fourth inch and three-eighths inch between the weld lines 75 and 76 in order to have room for his welding implement to make a satisfactory weld at a joint. Because of this practical limitation in the ability to make a good weld, it becomes necessary for the designer of the truss to ascertain if the joint construction is such as to permit the welder to make this good weld. An examination of Figure 4 as to its small scale, and even of the considerably larger scale of Figure 5, will show that where this represents a truss sixty feet long, for example, it will be impossible to measure dimensions within one-fourth inch because this is less than the thickness of a pencil line. Accordingly, the drafting instrument 11 is used to lay out to a larger scale, for example, half size, the several joints of the steel beam truss 74, or at least those joints which are suspected of having insufficient welding clearance. The Figure 5 shows a few of these joints laid out to a much larger scale than that shown in Figure 4, but even at this scale, the welding clearance dimensions are difficult to determine.

The Figures 7, 8, and 9 illustrate steps in the use of the drafting instrument 11 to check the adequacy of welding clearance of a joint of a steel beam truss, and Figure 6 illustrates a rough drawing so made to check such welding clearance. One first places any suitable sheet of paper on a support 20, such as a drafting board, and draws a reference line 82, such as with a T-square. The pivot pin 31 is next placed through the hole 30 in the instrument and pressed through the reference line 82 into the support 20. The instrument 11 may thus be rotated three hundred sixty degrees about this pivot pin 31. The particular joint chosen to be drawn is the joint 74A of the roof truss 73, which joint contains the diagonal beam member 79, the post member 86, and the upper chord member 87. All of these are what are commonly known as "I-beams." The designer of the truss has already selected the size beams for each of the various members of the truss 73, and the upper chord member 87, for example, may be an eight inch depth beam with a weight per foot of twenty-four pounds. All eight inch beams are not exactly eight inches overall depth, however, this being only a nominal dimension and the overall depth, according to standard practice, gradually increases as the weight per foot increases. The first calibration marks 58 (indicated at reference numeral 88) include a calibrated dimension for an eight inch I-beam weighing twenty-four pounds per foot and this is designated "8 WF 24." When the thumb nut 54 is loosened, and the index mark 57 is placed opposite the line leading to this designated dimension 8 WF 24, the parallel blades 39 and 40 will be moved closer together than the position shown in Figure 1. This will space the outer edges 45 and 46 the correct distance apart to indicate, at half scale, the overall depth of an eight inch I-beam weighing twenty-four pounds per foot. The thumb nut 54 should then again be tightened to maintain this spacing. The operator of the instrument 11 may therefore place the center line 29 of the instrument directly over the reference line 82, as shown in Figure 7, and draw lines along the outer edges 45 and 46 to indicate the overall depth of the upper chord member 87. Actually, since there is no welding to be performed on the upper flange of this chord member 87, this upper line need not be drawn. In Figure 6, line 89 represents the lower edge of chord member 87, as drawn along the outer edge 46 of parallel blade 40. The instrument may be rotated one hundred eighty degrees on its pivot and line 89 continued to the right by drawing along the outer edge of parallel blade 39.

The Figure 8 shows the next step in the drawing of the diagonal member 79. The particular truss under consideration is a roof truss which has a slope of three-eighths of an inch to the foot for drainage of water when a roof is laid over such a truss. Because of this slope of the top chord member 87 relative to the bottom chord member of the truss, the thumb nuts 24 should be loosened and the arcuate ring member 19 moved so that the zero mark or index mark 71 on the ring member 19 lines up with the three-eighths inch mark 91. This shifting of the ring member 19 is shown in Figure 8 and sets the instrument for the slope of the top chord 87. The Figure 4 shows that this diagonal has been designed to be a three inch I-beam with a weight of seven and one-half pounds per foot. The thumb nut 54 should be loosened and then the index mark 57 moved opposite the line leading to this designation of "3I7.5." Tightening the thumb nut 54 then assures that the outer edges 45 and 46 are spaced a distance apart equal to the actual overall dimensions of such a beam member. The instrument is rotated to the appropriate pitch of this diagonal member 79. The pitch of this diagonal member is determined from the line diagram of Figure 4. The first post member 89 is shown as having a length of four feet seven inches, and the upper chord member 87 is shown as having a slope of three-eighths of an inch to the foot. This means that the second post member which is the post member 86 in the joint 74 under study will be slightly longer in accordance with the distance between these two post members, which is shown in Figure 4 as being six feet, six and three-fourths inches. This means that the length of the post member 86 is about four feet, nine and one-half inches. Using this dimension plus the dimension of seven feet, which is the horizontal distance between post member 86 and the next post member 90, one determines that the pitch of the diagonal member 79 is eight and three-sixteenths to twelve. This angular pitch is located in the lower right quadrant on the calibration mark 65 and the entire instrument 11 is rotated until this angular pitch designation of eight and three-sixteenths is placed on the reference line 82. This will make the instrument in the position shown in Figure 8. Lines 94 and 95 may then be drawn along the outer edges of the parallel blades 39 and 40 to indicate the outer dimensions of the diagonal member 79. This gives both the pitch and the outside dimensions of this diagonal 79.

The third step is shown in Figure 9 and the parallel blades 39 and 40 are in this case readjusted to bring the index mark 57 opposite the line leading to dimension 4I9.5 of the calibration marks 58. This is because Figure 4 shows this post member 86 to be a four inch I-beam of a weight of nine and one-half pounds per foot. The instrument is rotated on its pivot so that the zero marks or index marks 71 on the ring member 19 is on the reference line 82. Lines 96 and 97 may then be drawn along the outer edges of the parallel blades to give the outside dimension of the post 86. The Figure 6 shows the completed rough drawing for checking the welding clearance and shows that the suspected critical dimension 98 is seven-eighths of an inch which is satisfactory clearance for welding. If the joint under suspicion proves not to have sufficient welding clearance, then the designer's job is to select other beams of different dimensions yet still having the requisite strength in accordance with the stresses pre-determined for the truss of Figure 4 and again lay out such joint in a manner similar to that outlined above to see if the new beam members have sufficient welding clearance.

The Figure 5 shows several different joints which are often encountered in trusses and the joint 100, for example, contains a dimension 101 which could easily be suspected of having insufficient welding clearance. In such a case one needs to draw on the rough drawing for checking the welding clearance, lines 102 and 103, indicating the outer dimensions of the post member 104, and one also needs to draw the line 105 indicating the thickness of the flange of this post member 104. The calibration marks 61 and the series of holes 60 are provided for this purpose. For example, if this post member 104 was a six inch beam of twelve pounds per foot called a "6B12," then the draftsman or designer in using the instrument 11 would first have moved the index mark 57 opposite the line leading to this notation "6B12" in the calibration marks 58 for setting the blades to the correct setting indicating the overall dimension of this post member 104. Next, the draftsman would place his pencil through the holes 106 and 107 and make a pencil mark on the paper. Then by loosening the thumb nut 54 and slightly collapsing the parallel blades 39 and 40 an appropriate amount and then retightening the thumb nut 54, the user of the instrument may draw lines along the outer edges 45 and 46 to indicate the dimensions of the thickness of the flanges of this post member 104. In this way the critical dimension 101 in Figure 5 may be determined.

The instrument 11 provides a convenient means for checking critical dimensions but this is only one suggested use of the instrument, and in general it provides a ready means for adjustably spacing parallel blades relative to the center line 29 and of also establishing these parallel blades at a given angle or pitch relative to a reference line 82. The lateral spacing may be used on only one of the parallel blades such as for drawing the line 89 in Figure 6, yet by using two parallel blades 39 and 40 the instrument is more convenient in use. The parallelogram links 35 and 36, however, provide a means for adjusting an outer edge such as edge 46 relative to the center line 29.

The first calibration marks 58 are used to determine the spacing of such an edge 46 relative to the center line 29. The second calibration marks 61 cooperate with these first calibration marks and cooperate with the series of holes 60 to provide dimensions for two additional parallel lines indicating the thickness of a flange of a beam.

The third calibration marks 63 are provided as a linear scale along the center line 29 and may be used for laying off lengths of the various chord, diagonal, or post members. Similarly, the fourth calibration marks 64 extend at right angles to the third calibration marks 63; and where non-standard beams, for example, are utilized, the width of such beams may be directly laid off from these fourth calibration marks 64. The fifth calibration marks 65 indicate the angle or pitch of members such as diagonal members, and in the particular usage contemplated such angle has been shown as pitch relative to the numeral 12 as a numerator or denominator; however, it will be obvious that such angular calibration marks might be in degrees. The sixth calibration marks 72 permit angular shifting of the ring member 19 relative to the head portion 17, and the use of this feature has been shown in Figures 8 and 9 to lay out the correct angle or pitch of the post and diagonal members relative to the slightly sloping upper chord member of a roof truss.

The pivot pin 31 provides a pivot whereby the parallel blade 39, as well as the parallel blade 40, may be pivoted to a desired angle relative to a reference line 82, and the protractor head 12 provides means for determining the correct angle or pitch.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A drafting instrument comprising, a protractor head having a base line and a semi-circular periphery, pivot means at the center of said base line, an arm pivoted at said pivot means for pivotal movement relative to a support, first and second parallelogram links pivoted to said arm, first and second parallel blades pivoted to said parallelogram links for parallel variable spacing of said two parallel blades, first calibration means cooperating with said parallel blades to aid in establishing the desired lateral spacing of said parallel blades, a series of marking points on each of said blades each having different spacing relative to the outer edges of said blades, second calibration means adjacent said marking points corresponding to said first calibration means, third calibration means extending along the center line of said arm as a linear scale, fourth calibration means extending along one side of the base of said protractor head as a linear scale, and fifth calibration means extending around the semi-circular periphery of said protractor head and calibrated in angular pitch.

2. A drafting instrument comprising, a protractor head having a base line and a semi-circular periphery, pivot means at the center of said base line, an arm pivoted at said pivot means for pivotal movement relative to a support, first and second parallelogram links pivoted to said arm, first and second parallel blades pivoted to said parallelogram links for parallel variable spacing of said two parallel blades, adjustable clamp means to selectively fix said parallel blades at a desired lateral spacing relative to said arm, first calibration means cooperating with said parallel blades to aid in establishing the desired lateral spacing of said parallel blades, a series of marking points on each of said blades each having different spacing relative to the outer edges of said blades, second calibration means adjacent said marking points corresponding to said first calibration means, third calibration means extending along the center line of said arm as a linear scale, fourth calibration means extending along one side of the base of said protractor head as a linear scale, and fifth calibration means extending around the semi-circular periphery of said protractor head and calibrated in angular pitch.

3. A drafting instrument comprising, a protractor head having a base line and a one hundred eighty degree semi-circular periphery, pivot means at the center of said base line, an arm pivoted at said pivot means for pivotal movement relative to a support, an arcuate semi-circular ring member located at least partially outboard of said head, first adjustable clamp means to adjustably secure said protractor head to said ring member, first and second parallelogram links pivoted to said arm, first and second parallel blades pivoted to said parallelogram links for parallel variable spacing of said two parallel blades, second adjustable clamp means to selectively fix said parallel blades at a desired lateral spacing relative to said arm, first calibration means cooperating with said parallel blades to aid in establishing the desired lateral spacing of said parallel blades, a series of marking points on each of said blades each having different spacing relative to the outer edges of said blades, second calibration means adjacent said marking points corresponding to said first calibration means, third calibration means extending along the center line of said arm as a linear scale, fourth calibration means extending along one side of the base of said protractor head as a linear scale, fifth angular calibration means extending around the semi-circular periphery of said ring member, and sixth angular calibration means cooperating between said ring member and said protractor head.

4. A drafting instrument comprising, a protractor head having a base line and semi-circular periphery, pivot means at the center of said base line, an arm pivoted at said pivot means for pivotal movement relative to a support, an arcuate semi-circular ring member cooperating with said head, first adjustable clamp means to adjustably secure said ring member to said protractor head, first and second parallelogram links pivoted to said arm, first and second parallel blades pivoted to said parallelogram links for parallel variable spacing of said two parallel blades, second adjustable clamp means to selectively fix said parallel blades at a desired lateral spacing relative to said arm, first calibration means cooperating with said parallel blades to aid in establishing the desired lateral spacing of said parallel blades, a series of marking points on each of said blades each having different spacing relative to the outer edges of said blades, second calibration means adjacent said marking points corresponding to said first calibration means, third calibration means extending along the center line of said arm as a linear scale, fourth calibration means extending along one side of the base of said protractor head as a linear scale, fifth angular calibration means extending around the semi-circular periphery of said ring member, and sixth angular calibration means cooperating between said ring member and said protractor head.

5. A drafting instrument comprising, a protractor head having a base line and a one hundred eighty degree semi-circular periphery, pivot means at the center of said base line, an arm pivoted at said pivot means for pivotal movement relative to a support, an arcuate semi-circular ring member located at least partially outboard of said head, arcuate slots in one of said protractor head and said ring member, bolts connected to the other of said protractor head and said ring member and extending through said arcuate slots, first thumb nut means threadably engaging said bolts to adjustably secure said protractor head to said ring member, first and second parallelogram links connected by pivots to said arm, first and second parallel blades connected by pivots to said parallelogram links for parallel variable spacing of said two parallel blades, second thumb nut means on at least one of said pivots to selectively fix said parallel blades at a desired lateral spacing relative to said arm, first calibration means cooperating with said parallel blades to aid in establishing the desired lateral spacing of said parallel blades, a series of marking points on each of said blades each having different spacing relative to the outer edges of said blades, second calibration means adjacent said marking points corresponding to said first calibration means, third calibration means extending along the center line of said arm as a linear scale, fourth calibration means extending along one side of the base of said protractor head as a linear scale, fifth calibration means extending around the semi-circular periphery of said ring member and calibrated in angular pitch, and sixth angular calibration means cooperating between said ring member and said protractor head.

6. A parallel rule protractor comprising, a protractor head and a parallel rule section, an arcuate semi-circular ring member cooperating with said head, first adjustable clamp means to adjustably secure said ring member to said protractor head, an integral arm as a part of said parallel rule section and integral with and extending generally at right angles to said protractor head, first and second parallelogram links pivoted to said protractor, first and second parallel blades pivoted to said parallelogram links for parallel variable spacing of said two parallel blades, second adjustable clamp means to selectively fix said parallel blades at a desired lateral spacing relative to said integral arm, first calibration means cooperating between said protractor head and said parallel blades to aid in establishing the desired lateral spacing of said parallel blades, a series of marking points on each of said blades each having different spacing relative to the outer edges of said blades, second calibration means adjacent said marking points corresponding to said first calibration means, pivot means at the intersection of the center line of said integral arm and the base line of a one hundred eighty degree semi-circle on said protractor head to provide a pivot point of the entire parallel rule protractor relative to a support, third calibration means extending along the center line of said integral arm as a linear scale, fourth calibration means extending at right angles from said integral arm center line along one side of the base of said protractor head as a linear scale, fifth calibration means extending around the semi-circular periphery of said ring member and calibrated in angular pitch, and sixth angular calibration means cooperating between said ring member and said protractor head.

7. A parallel rule protractor comprising, a protractor head and a parallel rule section, said protractor head having a generally semi-circular outer periphery, an arcuate semi-circular ring member located at least partially outboard of said head, arcuate slots in one of said protractor head and said ring member, bolts connected to the other of said protractor head and said ring member and extending through said arcuate slots, first thumb nut means threadably engaging said bolts to adjustably secure said protractor head to said ring member, an integral arm as a part of said parallel rule section and integral with and extending generally at right angles to said semi-circular protractor head, first and second parallelogram links pivoted to said protractor, first and second parallel blades pivoted to said parallelogram links for parallel variable spacing of said two parallel blades, second thumb nut means on at least one of said pivots to selectively fix said parallel blades at a desired lateral spacing relative to said integral arm, first calibration means cooperating between said protractor head and said parallel blades to aid in establishing the desired lateral spacing of said parallel blades, a series of marking points on each of said blades each having different spacing relative to the outer edges of said blades, second calibration means adjacent said marking points corresponding to said first calibration means, pivot means at the intersection of the center line of said integral arm and the base line of a one hundred eighty degree semi-circle on said protractor head to provide a pivot point of the entire parallel rule protractor relative to a support, third calibration means extending along the center line of said integral arm as a linear scale, fourth calibration means extending at right angles from said integral arm center line along one side of the base of said protractor head as a linear scale, fifth calibration means extending around the semi-circular periphery of said ring member and calibrated in angular pitch, and sixth angular calibration means cooperating between said ring member and said protractor head.

8. A parallel rule protractor comprising, a protractor head and a parallel rule section, said protractor head having a generally semi-circular outer periphery, an arcuate semi-circular ring member located partially outboard of said head, arcuate slots in said protractor head, bolts fastened in said ring member and extending through said arcuate slots, first thumb nut means threadably engaging at least some of said bolts to adjustably secure said protractor head to said ring member, an integral arm having root and outboard ends as a part of said parallel rule section and integral with and extending generally at right angles to said semi-circular protractor head, first and second parallelogram links pivoted to said integral arm near the root and outboard ends, respectively, first and second parallel blades pivoted to said parallelogram links in a parallelogram manner for coordinated pivoted movement of said parallelogram links to swing said two parallel blades closer together and farther apart, second thumb nut means on at least one of said pivots to selectively fix said parallel blades at a desired lateral spacing relative to said integral arm, a first index mark on one of said first parallelogram link and said parallel blades, calibration marks on said protractor head cooperating with said first index mark to aid in establishing the desired lateral spacing of said parallel blades, a series of holes in each of said blades each having different spacing relative to the outer edges of said blades, calibration marks adjacent said holes corresponding to said first calibration marks to indicate the spacing of two additional lines for each calibrated spacing of the outer edges of said blades, a reference hole at the intersection of the center line of said integral arm and the base line of a one hundred eighty degree semi-circle on said protractor head, a pin cooperating with said parallel rule protractor at said reference hole to provide a pivot point of the entire parallel rule protractor relative to a support, third calibration marks extending from said reference hole along the center line of said integral arm as a linear scale, fourth calibration marks extending at right angles from said integral arm center line along one side of the base of said protractor head as a linear scale, fifth calibration marks extending around the semi-circular periphery of said ring member and calibrated in angular pitch, a second index mark on said ring member, and sixth calibration marks on said protractor head cooperating with said second index mark upon said first thumb nut means being loosened and said ring member being movable relative to said protractor head.

9. A drafting instrument comprising, protractor means and parallel blade means, pivot means for said parallel blade means, means providing relative lateral spacing between said parallel blade means relative to a reference line longitudinally through said pivot means, calibration means to adjustably select the desired angle of said parallel blade means relative to said reference line, second calibration means to selectively set the lateral spacing of said parallel blade means relative to said reference line, third calibration means on said parallel blade means to establish the spacing of two additional lines relative to said reference line for a selected spacing of said parallel blade means, and fourth calibration means to selectively shift the preselected angle of said parallel blade means to a slightly different angle.

10. A parallel rule protractor for laying out joints in steel beam trusses composed of post, diagonal and chord members of I or H section having webs and flanges, said parallel rule protractor comprising, protractor means and parallel blade means, pivot means for the entire parallel rule protractor, means providing relatively movable lateral spacing between said parallel blade means relative to a reference line longitudinally through said parallel rule protractor, first calibration means to adjustably select the desired pitch of said parallel blade means in accordance with the selected pitch of a member of the steel beam truss to be laid out, second calibration means to selectively set the lateral spacing of said parallel blade means relative to said reference line in accordance with the depth of the selected beam member, third calibration means on said parallel blade means to establish the flange thickness of the selected beam members, and fourth calibration means to selectively shift the preselected pitch to a different angle to accommodate for roof trusses having a small drainage pitch per foot relative to the horizontal lower chord member of the truss.

References Cited in the file of this patent

UNITED STATES PATENTS

| | | |
|---|---|---|
| 513,828 | Riddle | Jan. 30, 1894 |
| 1,090,064 | Howard | Mar. 10, 1914 |
| 1,095,552 | Colpitts | May 5, 1914 |
| 1,367,423 | Nowak | Feb. 1, 1921 |
| 1,650,533 | Tresidder | Nov. 22, 1927 |
| 2,251,208 | Sigmon | July 29, 1941 |
| 2,556,781 | Smithson | June 12, 1951 |